United States Patent [19]
Dornberger

[11] 3,739,276
[45] June 12, 1973

[54] METHOD OF AND SYSTEM FOR MEASURING THE SPEED AND LENGTH OF A MOVING ELONGATED ARTICLE

[75] Inventor: Georg C. Dornberger, Phoenix, Ariz.

[73] Assignee: Western Electric Company, Incorporated, New York, N.Y.

[22] Filed: June 29, 1971

[21] Appl. No.: 157,863

[52] U.S. Cl. ................. 324/161, 324/175, 235/92, 33/129, 340/263
[51] Int. Cl. ............................................. G01p 3/56
[58] Field of Search ................. 235/92 DN, 92 PD; 33/129, 133, 134, 127, 141, 141.5, 142; 340/263; 324/161, 162, 166, 168, 171–175

[56] References Cited
UNITED STATES PATENTS

| | | | |
|---|---|---|---|
| 3,058,223 | 10/1962 | Schmidt et al. | 33/129 |
| 3,408,500 | 10/1968 | Carr | 324/175 |
| 3,456,187 | 7/1969 | Schmidt | 324/175 |
| 3,525,044 | 8/1970 | Richmond | 324/173 |

OTHER PUBLICATIONS
S. Salowe, W. C. Carter – Digital Instruments for Accurate Strip–Process Measurements – Westinghouse Engineer – July, 1961– p. 117-122.

*Primary Examiner*—Michael J. Lynch
*Attorney*—W. M. Kain, J. B. Hoofnagle, Jr., J. M. Revesz et al.

[57] ABSTRACT

A system for measuring the speed and length of a moving elongated article, such as a moving wire exiting from an insulating process, includes a roller of precisely measured circumference in frictional contact with the wire, a transducer for generating a precise number of pulses in response to each revolution of the roller and a counting unit for receiving the generated pulses. The circumference of the roller is preset into the counting unit to control a pulse multiplying circuit and a time period during which the pulses are counted. The counted pulses are divided down to render one pulse for each foot of wire moved past the roller and are coupled to a footage counter to indicate the length of wire which may be taken up on a strand take-up apparatus. The transducer pulses may be counted for the variable time period and displayed directly as the foot per minute speed of the wire. Additionally, preset high and low speed tolerance limits may be compared to the measured speed of the wire to activate alarm circuitry for measured speeds falling without the limits. The system may be interfaced with a computer to monitor or control the insulating process.

7 Claims, 3 Drawing Figures

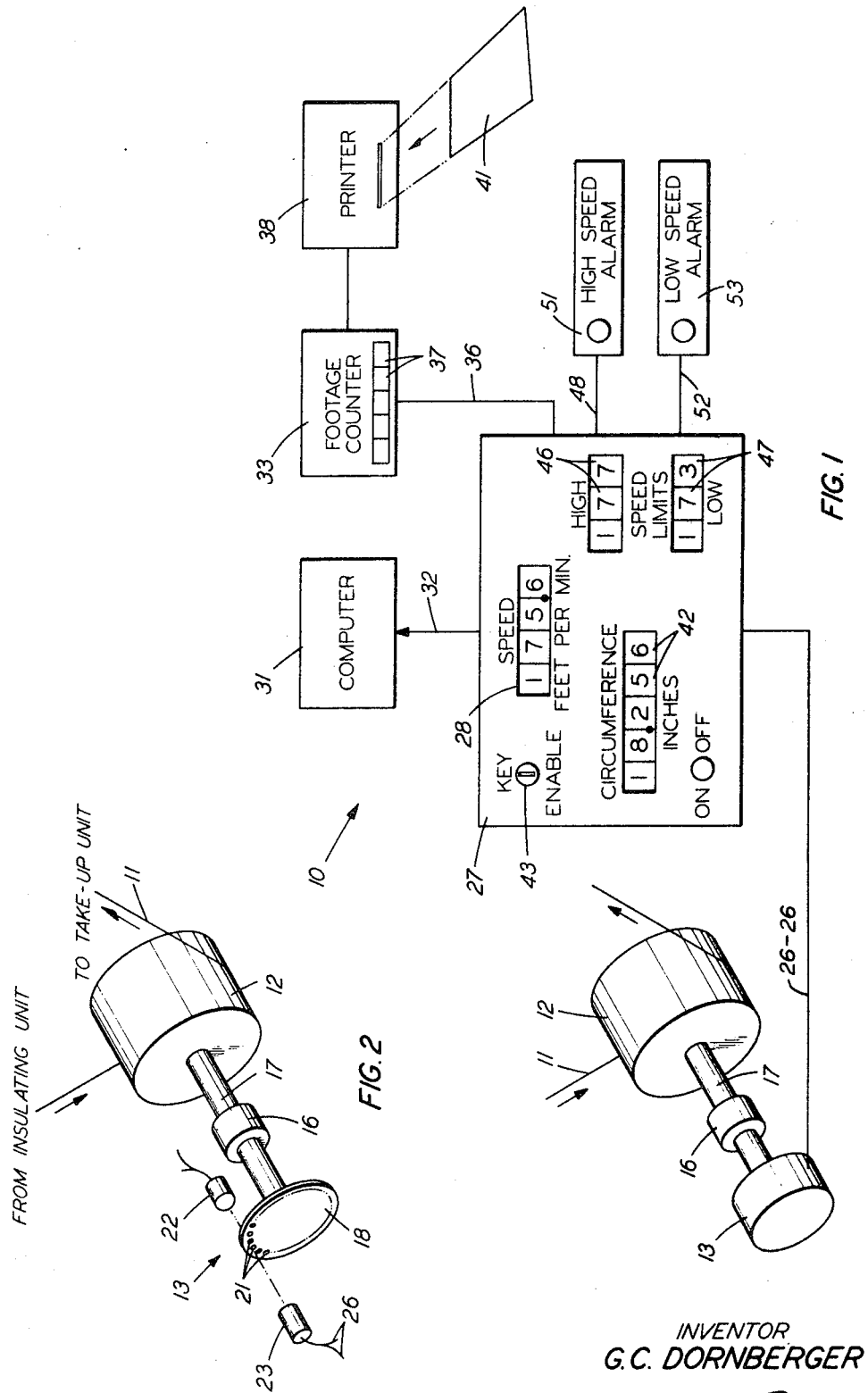

METHOD OF AND SYSTEM FOR MEASURING THE SPEED AND LENGTH OF A MOVING ELONGATED ARTICLE

BACKGROUND OF THE INVENTION

1. Field of the Invention

The present invention relates to methods of and systems for measuring the speed and length of a moving elongated article and more particularly to methods of and systems for measuring the linear speed and length of a continuously advancing strand, such as, for example, a wire undergoing an insulating process or a cable undergoing a jacketing process.

2. Technical Considerations and Description of the Prior Art

In the manufacture of strand material, for example, insulated conductor wire or jacketed communications cable, the material is caused to undergo one or more processing operations, for example, insulation or jacketing, and may be directed from the processing operations continuously, where it is wound upon suitable take-up elements such as successively presented reels of a take-up apparatus. In many of these processes the line speed, or speed with which the strand material passes through the process, must be held within close tolerance limits, for example, plus or minus one percent on an insulating line speed from 60 to 300 feet per minute, to insure that the finished product possesses the desired characteristics. In this connection it is desirable to known precisely the instantaneous speed with which the material moves through a given point in the process.

Additionally, it is desired to know precisely the length of the processed material actually taken up on each reel of the take-up apparatus in order to avoid the application of large safety factors which result in excess amounts of wire or cable on the take-up reels. These excess lengths, while they contribute to production costs, cannot be considered to be part of the actual production, thus increasing the cost of manufacture of the wire substantially, particularly for large manufacturers of wire and cable.

In the past, mechanically driven footage counters or electronic counters operated in response to the rotary movement of a follower sheave or a roller in frictional contact with the moving wire or cable have not been precise enough due to the errors introduced by gearing, the preciseness with which the roller can be manufactured, difficulties in applying compensating factors to account for the variance between wires of different gauges, excessive slippage between the roller and the wire and wear of the measuring element through prolonged use thereof.

Additionally, prior art wire speed measuring devices were separate units, incapable of measuring the length of the wire. Although it may be possible to obtain footage readings by measuring the speed over an extended time, such a method merely causes the inherent measuring errors to become cumulative and would not avoid the problem of excess lengths of wire or cable being wound upon the take-up reels.

SUMMARY OF THE INVENTION

One object of the present invention is to provide a new and improved method of and system for measuring and indicating the speed of longitudinally moving elongated article.

Another object of the present invention is to provide a new and improved method of and system for measuring the length of a longitudinally moving elongated article.

Another object of the present invention is to provide a new and improved method of and system for simultaneously measuring both the speed and the length of a longitudinally moving elongated article.

Another object of the present invention is to provide a new and improved method of and system for measuring and indicating the speed of a continuously advancing strand being taken up on successive take-up elements.

Another object of the present invention is to provide a new and improved method of and system for measuring the length of a continuously advancing strand taken up onto each successive take-up element of a strand take-up apparatus.

Another object of the present invention is to provide a new and improved method of and system for monitoring the speed of an elongated article undergoing a process and for providing an alarm indication when the speed of the article falls above or below predetermined limits.

Another object of the present invention is to provide a new and improved method of and system for simultaneously measuring and indicating the speed and length of an advancing elongated article in contact with a measuring roller wherein the roller itself may be of various sizes or may not be precisely machined or may be worn or otherwise not conform to nominally stated dimensions thereof.

Another object of the present invention is to provide a new and improved method of and system for simultaneously measuring and indicating the speed and length of an advancing elongated article utilizing a single transducer coupled to a roller in frictional contact with the article.

A method of measuring the speed of a longitudinally moving elongated article, embodying certain features of the invention, may include driving a rotatable member at a peripheral speed equal to the speed of the article at a fixed point, generating a predetermined number of pulses for each revolution of the rotatable member and counting the pulses for a predetermined period of time to obtain a number proportional to the length per unit time of the elongated article moving past the point.

A system for measuring the speed of a longitudinally moving elongated article, embodying certain features of the invention may include means for driving a rotatable member at a peripheral speed equal to the speed of the article at a fixed point, means for generating a predetermined number of pulses for each revolution of the rotatable member and means for counting the pulses for a predetermined period of time to obtain a number proportional to the length per unit time of the elongated article moving past the point.

A method of measuring the length of a longitudinally moving elongated article, embodying certain features of the invention may include driving a rotatable member at a peripheral speed equal to the speed of the article at a fixed point, generating a predetermined number of pulses for each revolution of the rotatable member, multiplying the pulses by a factor proportional to the circumference of the peripheral surface of the rotatable member, dividing the multiplied pulses to obtain one pulse for each unit length of the elongated article moving past the fixed point, and counting the divided pulses to obtain a number proportional to the number of unit lengths of the article moving past the fixed point.

A system for measuring the length of a longitudinally moving elongated article, embodying certain features of the invention may include means for driving a rotatable member at a peripheral speed equal to the speed of the article at a fixed point, means for generating a predetermined number of pulses by a factor proportional to the circumference of the peripheral surface of the rotatable member, means for dividing the multiplied pulses to obtain one pulse for each unit length of the elongated article moving past the fixed point, and means for counting the divided pulses to obtain a number proportional to the number of unit lengths of the article moving past the fixed point.

BRIEF DESCRIPTION OF THE DRAWINGS

The objects and various features of the invention will be more readily understood from the following detailed description of a specific embodiment thereof, when read in conjunction with the accompanying drawings, wherein:

FIG. 1 is a schematic illustration, in block form, of a system for simultaneously measuring and indicating the speed and length of an elongated article or strand such as, for example, a moving wire or cable;

FIG. 2 is a schematic illustration of one type of transducer which may be employed in the system of FIG. 1.

DETAILED DESCRIPTION

Figure 3:
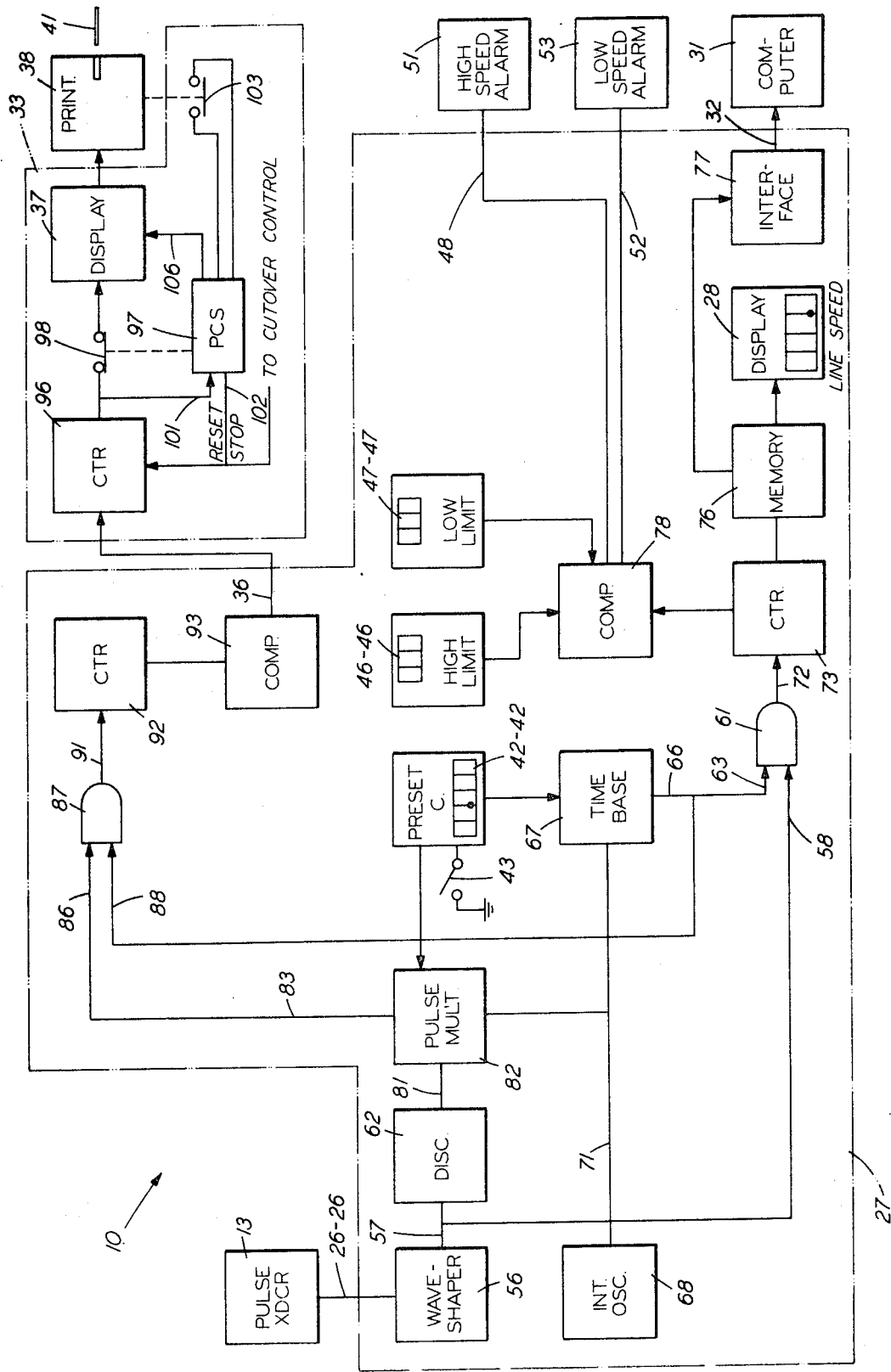
FIG. 3 is a detailed block schematic illustration of the system of FIG. 1.

Referring to FIG. 1, there is shown a speed and length measuring system 10 which may be used, for example, to measure the linear speed and length of a moving strand 11 which may be, for example, a wire conductor undergoing an insulating process which covers the wire with primary insulation material such as pulp or polyethylene. In such a process the speed of the wire 11 is commonly referred to as the line speed and is measured in feet per minute while the length of the processed wire is measured in feet.

The insulated wire 11 is driven by a conventional capstan device (not shown), and moves in the direction of the arrows around a roller 12, having a circumference C, in frictional contact with the wire 11, to a continuous take-up apparatus (also not shown), for example, of the type disclosed in Hauck et al., Pat. No. 3,403,013, or any of the various well-known types of wire take-up devices wherein the wire is wound alternately upon successively presented take-up reels.

As the wire 11 passes around the roller 12, the latter is driven rotatably to activate a transducer 13 through a coupling device 16 which connects a shaft 17 on the roller 12 to the transducer 13. The transducer 13 converts the rotary movement of the roller 12 into d.c. electrical pulses, and may be of the photoelectric, magnetic or any suitable type. The essential characteristics of the transducer 13 are that it exerts no significant drag on the roller 12 and is capable of producing a relatively large number of d.c. pulses for each revolution of the roller 12, for example, a minimum of 600 pulses for each revolution of roller 12. Any slippage occurring between the roller 12 and the wire 11, will then result in a loss of a relatively few pulses out of many without a great loss of accuracy such as would occur if there were only one or two pulses generated by the transducer 13 for each revolution of the roller 12.

A preferred embodiment of the transducer 13 is shown in FIG. 2 and may include a rotary disc 18 coupled to the shaft 17 of roller 12 and having a plurality of circumferentially spaced apertures or notches 21-21 formed therethrough and interposed between a light source 22 and a photoconductive element 23, such as a photocell. As the disc 18 rotates with the driven roller 12, the intermittently interrupted light from the source 22 impinges on the photocell 23 to produce pulses on a pair of output leads 26-26 thereof.

As shown in FIG. 1, the tranducer 13 is coupled to a counting unit 27, the operation of which is discussed in more detail below, which displays the speed of the wire 11 to within one-tenth of a foot per minute on a display 28, which may consist of digital indicator tubes, solid-state electroluminescent devices or the like. The displayed number representing the speed of the wire 11 may also be fed to a computer 31 or other data processing unit, through an output 32, to monitor or control the insulating process.

The counting unit 27 is connected to a footage counter 33 through an output 36. One pulse is rendered on output 36 for each foot of wire 11 moving past the roller 12. The accumulated footage of the wire 11 is displayed on a digital display 37 associated with the footage counter 33. As discussed in greater detail below, the footage counter 33 may be coupled to a printer 38 which may be operated to print the displayed footage of wire onto a card 41 inserted therein.

The circumference of the roller 12 can vary on different insulating machines, for example, on certain pulp insulating machines the circumference of roller 12 may vary between 1 and 4 feet. It is also well known that nominally equal size rollers may also vary in their actual circumferential measurements. Furthermore, because of wear in use, the roller circumferences may vary considerably over a period of time. For this reason, the counting unit 27 is provided with means for presetting the precise value of the circumference of the roller 12 therein. The circumference of the roller 12 may be measured precisely and the measured value thereof may be set manually into the counting unit 27 through a set of digital switches 42-42 which are preferably thumbwheel switches but may be dial switches or pushbutton-activated selector switches or any suitable type devices capable of selecting digits in a 1-2-4-8 binary-coded-decimal code. The five decade thumbwheel switches 42-42 are designed to preset a roller circumference up to 99.999 inches into the counting unit 27. A roller circumference having a nominal value of one foot may be precisely measured by one or more well-known methods as 12.048 inches. In the preferred embodiment, the roller circumference is measured to within one-thousandth of an inch.

The counting unit 27 is provided with a key-operated enabling switch 43 which may be closed manually by the insertion therein and turning of a key by an operator after the precise circumference of the roller 12 is set on the switches 42-42 to lock or unalterably establish the circumference setting into the counting unit 27. Once the circumference of roller 12 is preset on the switches 42-42 and locked, mechanical variations of the switches 42-42 are ineffective to vary the preset value. The preset value of the circumference of the roller 12 may be changed only by unlocking the enabling switch 43.

Two additional sets of thumbwheel switches 46-46 and 47-47 may be utilized to preset predetermined high and low line speed limits into the counting unit 27. As will be more clearly understood in the following discussion, the counting unit 27 compares the value of the first three digits appearing on the display 28 to the digits set on the thumb-wheels 46-46 and 47-47. A displayed line speed above the high limit set on the thumbwheels 46-46 results in an output on a line 48 connected to an alarm circuit 51, while a displayed line speed below the low limit set on thumbwheels 47-47 results in an output on a line 52 to an alarm circuit 53.

Referring to the block diagram of FIG. 3, it should be noted at the outset that the units represented by each rectangular box are of conventional design and that a detailed illustration of the individual ones thereof is not considered essential to a proper understanding of the invention. The counters and comparators are preferably of the readily available integrated circuit types manufactured by various semiconductor manufacturers.

The output of transducer 13 is coupled to a wave shaping circuit 56 which may be a Schmitt trigger or the like for correcting any excessively slow or fast rise times of the received pulses and for insuring that the pulse amplitudes on an output 57 of the wave shaper 56 are uniform. The shaped pulses from circuit 56 are fed simultaneously to a first input 58 of a first AND gate 61 and a discriminator circuit 62.

The first AND gate 61 has a second input 63 coupled to an output 66 of a time base circuit 67 which enables AND gate 61 for a time period proportional to the preset value of the circumference of the roller 12. In a given insulating machine, wherein the circumference of roller 12 may vary from 1 to 4 feet or from 12.000 to 48.000 inches, the time base circuit 67 will eanble gate 61 for a time period T having a value of from 1 to 4 seconds. This may be accomplished by establishing a high d.c. voltage level on the output 66 of time base circuit 67 for as long as it takes an internal oscillator or clock pulse generator 68 having a frequency $f_s$ equal to some decimal multiple $10^n$ of 12 to generate sufficient pulses to reach a count preset into the time base circuit by the thumbwheels 42-42 and equal to the same decimal multiple of the circumference of roller 12 in inches.

As a specific example, the pulse generator 68 may be selected to generate a frequency $f_s$ of 12,000 pulses per second on an output 71 thereof coupled to the time base circuit 67. If the circumference of the roller 12 is precisely measured as 4 feet, within one thousandth of an inch, the value 48.000 is manually preset on the thumbwheels 42-42. Each thumbwheel 42 represents a decimal digit which may be established in the time base circuit 67 in a 1-2-4-8 binary-coded-decimal code to establish a preset number of 48,000 therein, representing the circumference of roller 12 in thousandths of an inch. Thus, a high level output will appear on output 66 of time base circuit 67 for 4 seconds, the time it takes the pulse generator 68 to count up to 48,000 at the rate of 12,000 pulses per second. Similarly, a precisely measured roller circumference of 3 feet is preset on the thumbwheels 42-42 as 36.000 inches, establishing a count of 36,000 in the time base circuit 67, to reach which count it must take the pulse generator 68 3 seconds at the rate of 12,000 pulses per second. From this it is seen that the time base T of the system 10 is equal to the circumference of the roller 12 in feet.

It must be again noted that it is desirable to provide a key operated enabling switch 43 for establishing the preset value of the circumference of roller 12 into the counting unit 27. This may be accomplished by providing a common return or ground for the outputs of thumbwheels 42-42 to set the value thereof into the time base circuit 43 only when a key is inserted and turned in the key switch 43 to close the latter. The switch 43 is opened when the key is turned back to its insert position and is retracted to lock the preset value of the circumference of roller 12 into the system. The preset circumference may thereafter be changed only by a resetting of the thumbwheels 42-42 and a closure of the switch 43.

The AND gate 61 is enabled to pass the pulses delivered thereto from the wave shaping circuit 56 for the time period T established by the time base circuit 67. The pulses appear on an output 72 of AND gate 61 for the variable gate time and are received by a straight counter 73. Counter 73 counts the pulses from AND gate 61 and is reset automatically after each time period T. The space between successive time periods may be in the order of a few nanoseconds. Counter 73 is capable of counting up to 9,999 pulses and delivers the full count at the end of each time period to a storage or memory circuit 76 coupled to the line speed display 28 and a computer interface circuit 77 coupled to the computer 31 through the output 32. The memory circuit 76 may be a plurality of parallel flip-flops for delivering the ultimate count of the counter 73 to the interface circuit 77 and the line speed display 28. The interface circuit 77 merely insures that the speed data received from the memory circuit 76 are of sufficient amplitude and duration to be sensed by the computer 31 and may include means for checking data validity.

The first three digits of the count on counter 73 are fed to a comparator circuit 78 along with the three digit high and low line speed tolerance limits preset on the thumbwheels 46-46 and 47-47, respectively. The comparator circuit 78 compares the first three digits of the output of counter 73 to the preset limits and renders an alarm signal on output 48 or 52 when the count on counter 73 is greater than the limit preset on the thumbwheels 46-46 or less than the limit preset on the thumbwheels 47-47, respectively.

The count appearing on the line speed display 28 is the direct feet per minute speed of the wire 11, as it moves past the roller 12, to within one-tenth of a foot per minute. As a specific example, if the line speed is 300 feet per minute, the circumference of the roller 12 is 1 foot or 12.000 inches and the transducer 13 produces 600 pulses per revolution, the number of pulses per second received on the first input of AND gate 61 may be calculated as follows:

$$300 \frac{\text{ft.}}{\text{min.}} \times 1 \frac{\text{rev.}}{\text{ft.}} \times \frac{1}{60} \frac{\text{min.}}{\text{sec.}} \times 600 \frac{\text{pulses}}{\text{rev.}} = 3000 \frac{\text{pulses}}{\text{sec.}}$$

Since the circumference of roller 12 is 1 foot the time period T established by the time base circuit 67 is equal to one second, during which time a total of 3,000 pulses are delivered from the wave shaper 56 through AND gate 61 to the counter 73. The line speed display 28 shows this count as 300.0 feet per minute, the line speed assumed above.

The same line speed would be displayed regardless of the size of the roller 12, as long as it is measured and preset on the thumbwheel switches 42-42 to establish the proper time period T.

As a further example, assuming the same line speed and the same number of pulses produced by the transducer 13 for each revolution of the roller 12, the pulses per second delivered to the AND gate 61 if the roller circumference were 4 feet or 48.000 inches and preset on the thumbwheels 42-42 may be calculated as:

$$300 \frac{\text{ft.}}{\text{min.}} \times \frac{1}{4} \frac{\text{rev.}}{\text{ft.}} \times \frac{1}{60} \frac{\text{min.}}{\text{sec.}} \times 600 \frac{\text{pulses}}{\text{rev.}} = 750 \frac{\text{pulses}}{\text{sec.}}$$

It can be seen that the pulse rate is slower with a larger roller since the transducer 13 produces a fixed number of pulses for each revolution of the roller 12. However, since the roller circumference is larger, the time period T is longer since it is directly proportional to the roller circumference. This for a roller circumference of 4 feet the time period T is 4 seconds. At a pulse rate of 750 pulses per second, the counter 73 will count up to 3,000 pulses in 4 seconds and, once again, the displayed line speed appearing on display 28 is 300.0 feet per minute.

Thus the system 10 as thus far described is capable of measuring and displaying the speed of the wire 11 as it moves past the roller 12. The speed is measured and displayed individually for each time period T, minimizing the possiblity of cumulative error. The system thus far described is also capable of feeding the line speed to a process control computer to control the insulating or other process, and of rendering an alarm when the line speed of the process varies above or below presettable limits.

The remainder of the system of FIG. 3 computes the length or footage of the wire 11 as it moves past the roller 12 from the same information as the line speed is computed, that is, from the pulses produced by the transducer 13 and the value of the circumference of the roller 12. It will be seen how the system 10 may be utilized to great advantage with a strand reeling or take-up apparatus by utilizing the footage counter 33 in conjunction with the printer 38.

The discriminator 62 renders an output pulse on an output 81 thereof in response to the receipt of the leading and trailing edges of each pulse on the output 57 of the wave shaper 56, thus doubling the number of output pulses of the transducer 13. The discriminator 62 may be a one-shot multivibrator or the like, for producing uniformly spaced pulses on the output 81.

The doubled pulses on the output 81 of the discriminator 62 are fed to a pulse multiplier circuit 82 together with the pulses from the pulse generator 68 and the preset value of the circumference of the roller 12 controlled by the thumbwheel switches 42-42. The pulse multiplier 82 may be a combination of a multiplier circuit and a divider circuit in series, which renders an output having a frequency determined by the equation $$f_{pm} = (f_x/f_s) \times C,$$

where $f_{pm}$ is the output frequency of the pulse multiplier circuit 82 in pulses per second, $f_x$ is the pulse rate from the discriminator 62 in pulses per second, $f_s$ is the frequency of the pulse generator 68, in pulses per second, and $C$ is the circumference of roller 12 in thousandths of inches.

It will be seen that for a particular line speed the output frequency of the pulse multiplier 82 is a constant. It has been seen that for a line speed of 300 feet per minute and a roller circumference of 1 foot, the transducer 13 produces 3,000 pulses per second, which is doubled by the discriminator circuit 62 to produce 6,000 pulses per second on output 81 thereof. The pulse multiplier 82 merely multiplies this frequency $f_x$ by the circumference setting C in thousandths of inches on the thumbwheels 42-42 and then divides the product by the frequency $f_s$ of the pulse generator 68. Thus, in the chosen example, the output of the pulse multiplier 82 is $$f_{pm} = (6,000/12,000) \times 12,000 = 6,000 \text{ pulses per second}$$

If the circumference of the roller 12 is 4 feet or 48.000 inches and is set on the thumbwheels 42-42 and locked into the unit 27 by the key operated enabling switch 43, the transducer 13 produces 750 pulses per second, which, when doubled by the discriminator 62, is equal to an $f_x$ of 1,500 pulses per second and, the output of the pulse multiplier 82 is $$f_{pm} = (1,500/12,000) \times 48,000 = 6,000 \text{ pulses per second.}$$

If other line speeds are assumed, the pulse rate from the pulse multiplier 82 will change but it is a constant at a given line speed.

Thus, a line speed of 300 feet per minute produces 6,000 pulses per second on an output 83 of the pulse multiplier 82. The output of pulse multiplier 82 is connected to a first input 86 of a second AND gate 87, having a second input 88 thereof coupled to the output 66 of the time base circuit 67. The gate 87 is enabled for the same period and at the same time as the gate 61 previously discussed. The output 83 of the pulse multiplier 82 is thus passed by the gate 87 for the variable gate time T, depending upon the circumference of the roller 12, over an output 91 to a second straight counter 92. The counter 92 is coupled to a second comparator circuit 93 which divides the incoming pulses from the counter 92 by a constant to render one pulse per foot on the output 36 of the comparator 93 to the footage counter 33.

In the chosen example, with a line speed of 300 feet per minute or 5 feet per second and roller 12 circumferences of 1 to 4 feet, set on thumbwheels 42-42 as 12.000 to 48.000 inches, the time period T will be between 1 and 4 seconds for a particular preset circumference. Since it has been shown that the pulse multiplier 82 in this case always delivers 6,000 pulses per second to the counter 92 for the time T, the total number of pulses delivered during successive time periods may vary from 6,000 to 24,000 pulses.

If the preset circumference of the roller 12 is 1 foot or 12.000 inches, the counter 92 will count 6,000 pulses per second for one second, thus accumulating a total of 6,000 pulses which are fed to the comparator 93. Since it is desired to produce one pulse for each foot of wire 11 moving past roller 12, and since the assumed speed of the wire 11 is 300 feet per minute or 5 feet per second, the length of wire 11 passing roller 12 in one second is 5 feet, so that five pulses should appear on output 36 in the one second time interval. This will occur if the comparator 93 is set to render one pulse out for every 1,200 pulses in from counter 93. This comparator setting will be a constant regardless of the speed of the wire 11 since it depends only upon the parameters of the transducer 13, the pulse generator 68 and the circumference of roller 12.

It will be noticed that 1,200 is the number of pulses produced at the output 81 of the discriminator 62 for each revolution of the roller 12. If a transducer 13 having an output of 1,200 pulses per revolution is selected, the discriminator circuit may be eliminated entirely for the footage measurement and the output of counter 92 may be divided by the number of pulses for each revolution of the roller 12 produced by the transducer 13.

To complete the chosen example, if the roller 12 has a measured circumference of 4 feet, the 6,000 pulses per second from the pulse multiplier 82 will be passed to counter 92 for 4 seconds, delivering a total of 24,000 pulses to counter 92. Out of 24,000 pulses delivered to the comparator 93 from counter 92 if a pulse is rendered on output 36 for every 1,200 pulses, 20 pulses will be delivered to the footage counter 33 indicating that 20 feet of wire 11 has moved past roller 12 in a 4 second time interval. Twenty feet in 4 seconds is equal to 5 feet per second or 300 feet per minute, the assumed line speed.

It should be noted that the counter 92 need not automatically reset after each time interval T since the comparator 93 acts only on the pulses delivered to it.

When the wire 11 is exiting from an insulating line to a take-up apparatus, it is almost always desired to provide a given number of feet of wire on each successively presented reel of the take-up apparatus. As an example, in the take-up apparatus disclosed in Hauck et. al. Pat. No. 3,408,013 a wire may be distributed and wound onto a first take-up reel until a predetermined length of wire is accumulated on the reel. Thereafter, the distribution of the wire is shifted to a second empty take-up reel, and the first reel is removed and replaced by another empty reel, which awaits the distribution of the wire thereon when a predetermined amount of the wire has been accumulated on the second reel.

The system 10 may be utilized to indicate the footage of wire 11 accumulated on each successively filled take-up reel of a take-up apparatus. As mentioned above, one pulse per foot of wire 11 moving past roller 12 is delivered to the footage counter 33 on output 36 of comparator 93. The footage counter 33 includes a straight counter 96 which may have a 1-2-4-8 binary-coded-decimal output, a preset-count-stop or PCS circuit 97 and the display 37.

The output of the counter 96 is selectively coupled to the display 37 through a contact 98 which is representative of a plurality of contacts which may be controlled by a relay (not shown) in the PCS circuit 97. The PCS circuit 97 is capable of being preset to energize a relay to open contact 98 when the count on the counter 96 reaches a preset value, which represents the footage desired on each reel of the take-up apparatus. The output from the counter 96 is received on an input 101 of PCS circuit 97, which is preset to render a signal on an output 102 thereof to stop, reset, and start the counter 96 over again when the preset value is reached and to disconnect the counter 96 from the display 37. The signal on output 102 may be used to actuate the electrical control apparatus for the cutover mechanism of the take-up apparatus. The wire 11 is thereafter wound upon another previously empty reel while the display 37 shows the accumulated wire on the full reel. The counter 96 once again starts counting the received pulses from the comparator 93, but the count thereof is not displayed since the counter 96 is disconnected from the display 37.

The display 37 may be coupled to the printer unit 38 wherein the card 41 may be inserted to have the displayed footage printed thereon. The footage displayed and printed should be the actual footage of the wire 11 on the full reel and may differ from the preset desired value. The printed card 41 may be attached to the full reel to indicate the amount of wire thereon.

When the card 41 is inserted into the printer 38 a relay therein may be operated to close a contact 103 to cause the PCS circuit to render a signal on an output 106 thereof to reset the display 37 to zero and to close the contact 98 to permit the counter 96 to supply the accumulated count therein to the display 37, indicating the number of feet delivered to the new reel since the time of cutover thereto.

It is believed that the operation of the above-described system will be apparent from the foregoing description. While the system has been described as being suitable for use with a wire insulating process involving specified line speeds, roller circumferences and transducer outputs, it will be obvious that various changes and modifications may be made without departing from the spirit and scope of the invention.

What is claimed is:

1. A system for measuring the length of a longitudinally moving strand, which comprises:
   a roller mounted for revolution ahd having a peripheral surface in frictional engagement with the strand;
   a transducer coupled to said roller for generating a predetermined number of pulses for each revolution of said roller;
   means for multiplying said pulses by a factor proportional to the circumference of the peripheral surface of said roller;
   means for counting said multiplied pulses for a time period proportional to the magnitude of the circumference of said roller; and
   means for dividing said counted pulses by a factor proportional to the number of pulses generated by said transducer for each revolution of said roller to produce one pulse for each unit length of said strand engaging said roller.

2. A system as set forth in claim 1, and including:
   means for counting said divided pulses until a predetermined count is achieved; and
   means responsive to the achievement of said predetermined count for resetting said divided pulse counting means.

3. A system as set forth in claim 2, and including:
   display means for displaying said achieved count; and
   printing means actuable to make a permanent record of said displayed count.

4. A system for measuring the speed and length of a longitudinally moving article, which comprises:

a rotatable member in frictional engagement with the article and having a circumference of a magnitude C;

a transducer coupled to said rotatable member for generating a fixed number of electrical pulses for each revolution of said rotatable member;

first counting means coupled to said transducer for receiving said pulses for a period of time, T, proportional to C;

display means coupled to said first counting means for displaying the number of pulses received by said first counting means during said time T to indicate the length per unit time of the elongated article engaging said rotatable member;

multiplying means coupled to said transducer for receiving and multiplying said generated pulses by a factor proportional to C;

second counting means coupled to said multiplying means for receiving said multiplied pulses for said period of time T; and comparator means coupled to said second counting means for dividing said multiplied pulses by a factor proportional to the number of pulses generated by said transducer for each revolution of said rotatable member to render one pulse for each unit length of said article engaging said rotatable member.

5. A system as set forth in claim 4, wherein said article is a continuously advancing strand, and including:

a clock pulse generator having a frequency $f_s$;

a plurality of presettable digital devices having an adjustable value proportional to C;

a time base circuit coupled to said pulse generator and said digital devices for rendering an output for a period of time proportional to the magnitude of $C/f_s$;

first and second AND gates each having first and second inputs and an output;

means coupling the first input and the output of said first AND gate between the output of said transducer and said first counting means;

means coupling the second input and the output of said second AND gate between said multiplying means and said second counting means; and means coupling the output of said time base circuit to the second input of said first AND gate and the first input of said second AND gate for rendering said first and second counting means operable to count the pulses from said transducers and said multiplying means, respectively, for said period of time T.

6. A system as set forth in claim 5, including:

means coupling said digital devices to said multiplying means;

means coupling said pulse generator to said multiplying means, and wherein said multiplying means includes:

means for multiplying said pulses produced by said transducer by the preset value of said digital devices; and means for dividing said multiplied pulses by the frequency of said pulse generator.

7. A system as set forth in claim 6, wherein said circumference of said rotatable member is preset in decimal multiples of inches, the frequency of said pulse generator is a decimal multiple of 12, and said transducer produces 600 pulses for each revolution of said rotatable member, whereby said first counter counts up to a number representing the direct feet per minute ratio of said wire engaging said rotatable member and said comparator means renders one pulse for each foot of said wire engaging said rotatable member.

* * * * *